United States Patent [19]
Russell

[11] 3,857,131
[45] Dec. 31, 1974

[54] MEAT HANDLING EQUIPMENT

[75] Inventor: Herman F. Russell, Detroit, Mich.

[73] Assignee: The Hobart Manufacturing Company, Troy, Ohio

[22] Filed: May 18, 1973

[21] Appl. No.: 361,786

Related U.S. Application Data

[60] Division of Ser. No. 177,302, Sept. 2, 1971, , which is a continuation-in-part of Ser. No. 877,229, Nov. 17, 1969, Pat. No. 3,606,628.

[52] U.S. Cl.................. 15/3.17, 15/230, 29/121 A
[51] Int. Cl............................................ A22c 17/08
[58] Field of Search ................ 15/3, 3.1, 3.16, 3.17, 15/93 R, 97 R, 102, 230, 48, 3.13; 29/121 A; 17/11.1 R

[56] References Cited
UNITED STATES PATENTS

| 2,154,187 | 4/1939 | Scoville | 15/93 R UX |
| 2,314,700 | 3/1943 | Hanshaw | 17/11.1 R |
| 2,690,752 | 10/1954 | Lakin | 29/121 A X |
| 2,753,590 | 7/1956 | McKendree | 17/11.1 R |
| 2,817,862 | 12/1957 | Frazho et al. | 15/3.17 |
| 2,826,772 | 3/1958 | Smith | 15/3.17 |
| 2,929,088 | 3/1960 | Wier, Jr. | 15/230 |

Primary Examiner—Edward L. Roberts
Attorney, Agent, or Firm—Biebel, French & Bugg

[57] ABSTRACT

A meat cleaning machine incorporates a pair of laterally adjustable sections, each incorporating a wire-like rotating gripping roller, which engage and move cuts of meat therebetween. A brush is associated with each roller for cooperation therewith in effecting a cleaning of the moved meat.

13 Claims, 4 Drawing Figures

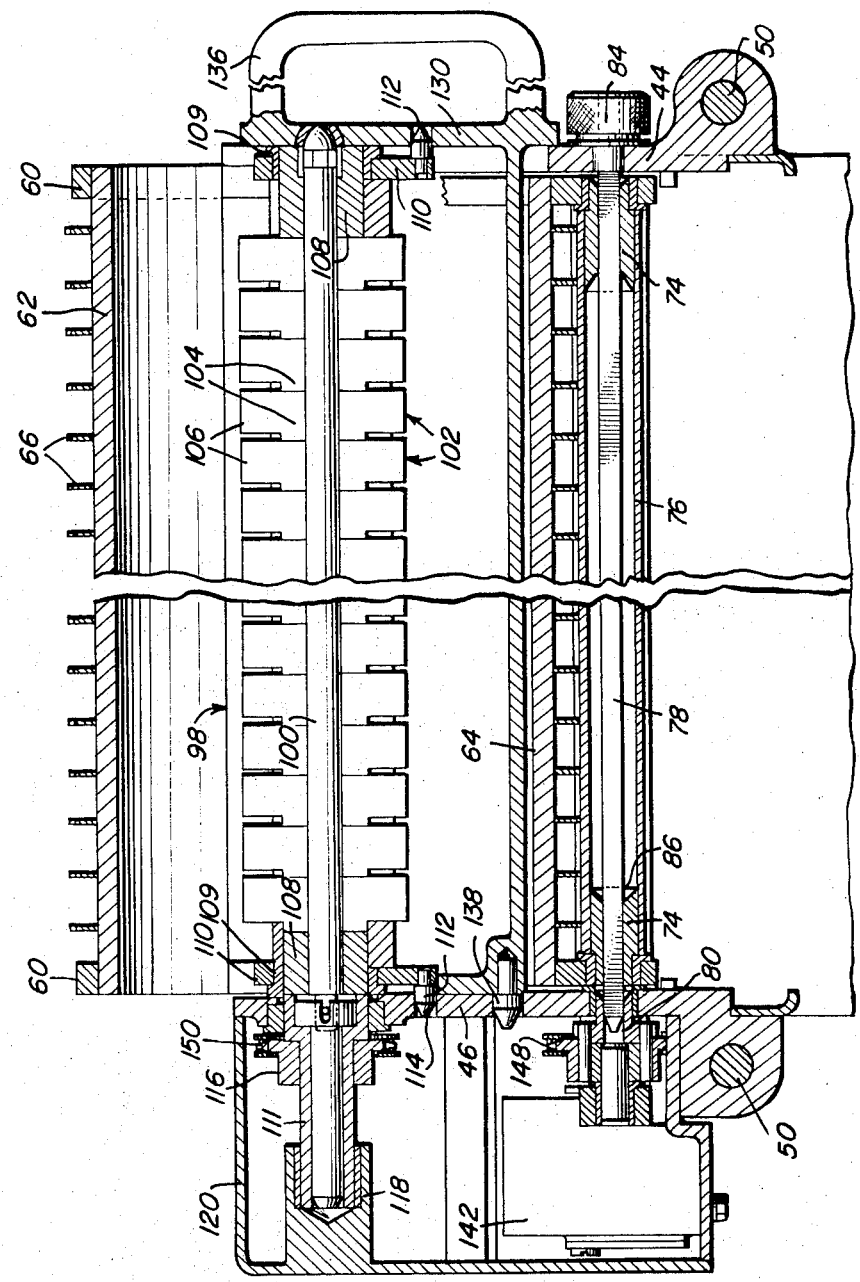

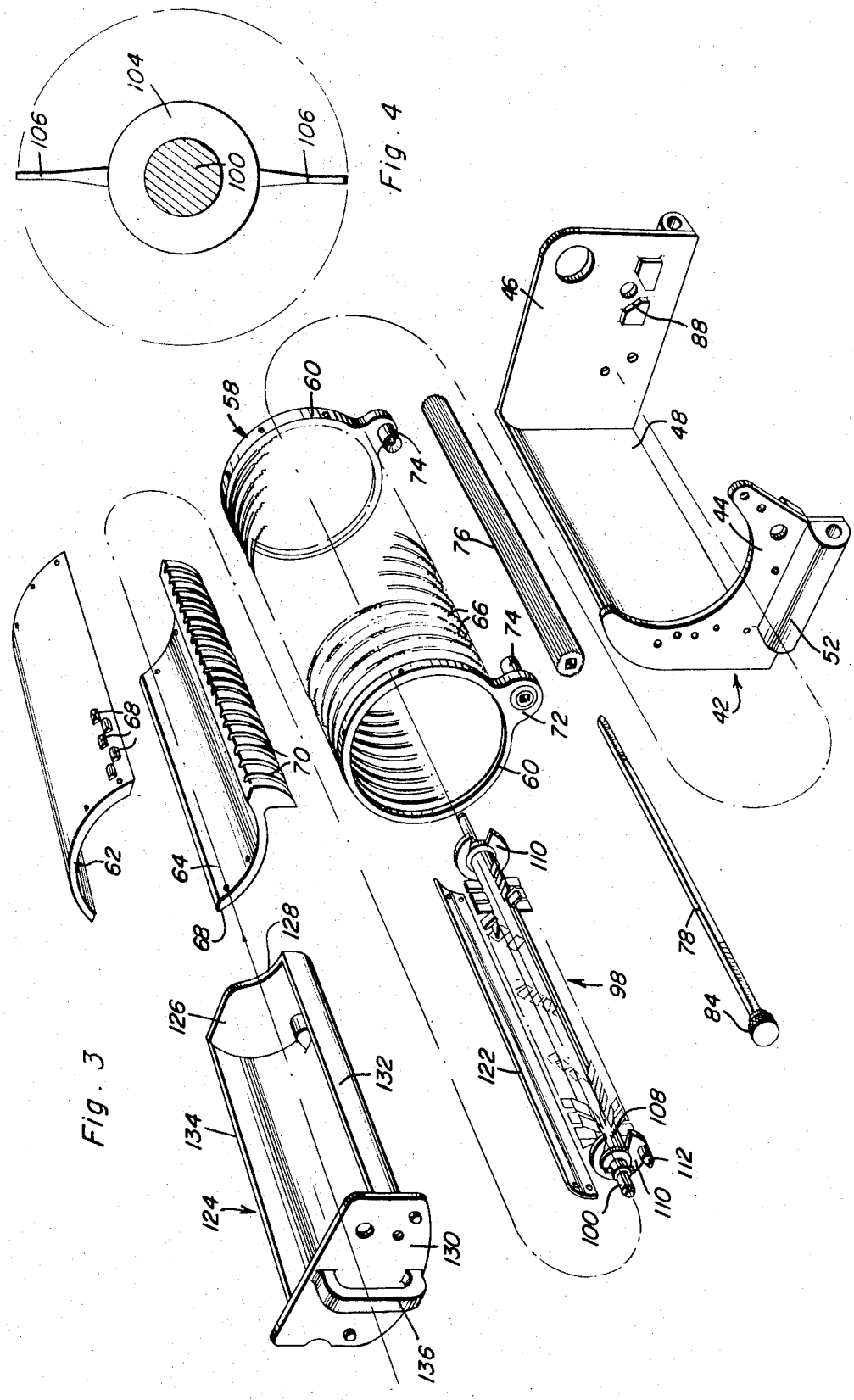

MEAT HANDLING EQUIPMENT

CROSS REFERENCE TO RELATED APPLICATIONS

This is a divisional application of U.S. application Ser. No. 177,302, filed Sept. 2, 1971, for "Meat Handling Equipment", which is in turn a continuation-in-part of U.S. application Ser. No. 877,229, filed Nov. 17, 1969, and now Pat. No. 3,606,628, issued Sept. 21, 1971.

BACKGROUND OF THE INVENTION

The instant invention is concerned with new and useful improvements in meat handling systems and equipment which contribute to the efficient and rapid handling of meat from the time immediately subsequent to the cutting of the meat through the wrapping stage.

SUMMARY OF THE INVENTION

The primary equipment included in the system comprises a meat cleaning machine which is basically similar to that disclosed in U.S. Pat. No. 3,606,628, particularly with regard to the mounting and overall operation thereof. However, significant structural differences are present which combine to increase the efficiency and operability of the machine in order more effectively to perform its primary function, that of receiving a cut of meat, automatically adjusting itself to the thickness of the cut and automatically moving the meat through a cleaning operation which effectively cleans both sides thereof, removing bone dust, marrow, meat particles and the like prior to an automatic discharge of the meat.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged longitudinal cross section through one of the cleaning heads or sections;

FIG. 3 is an exploded perspective view of the major components of one of the sections; and FIG. 4 is a detail of one of the brush blades.

DESCRIPTION OF THE PREFERRED EMBODIMENT

Figure 1:
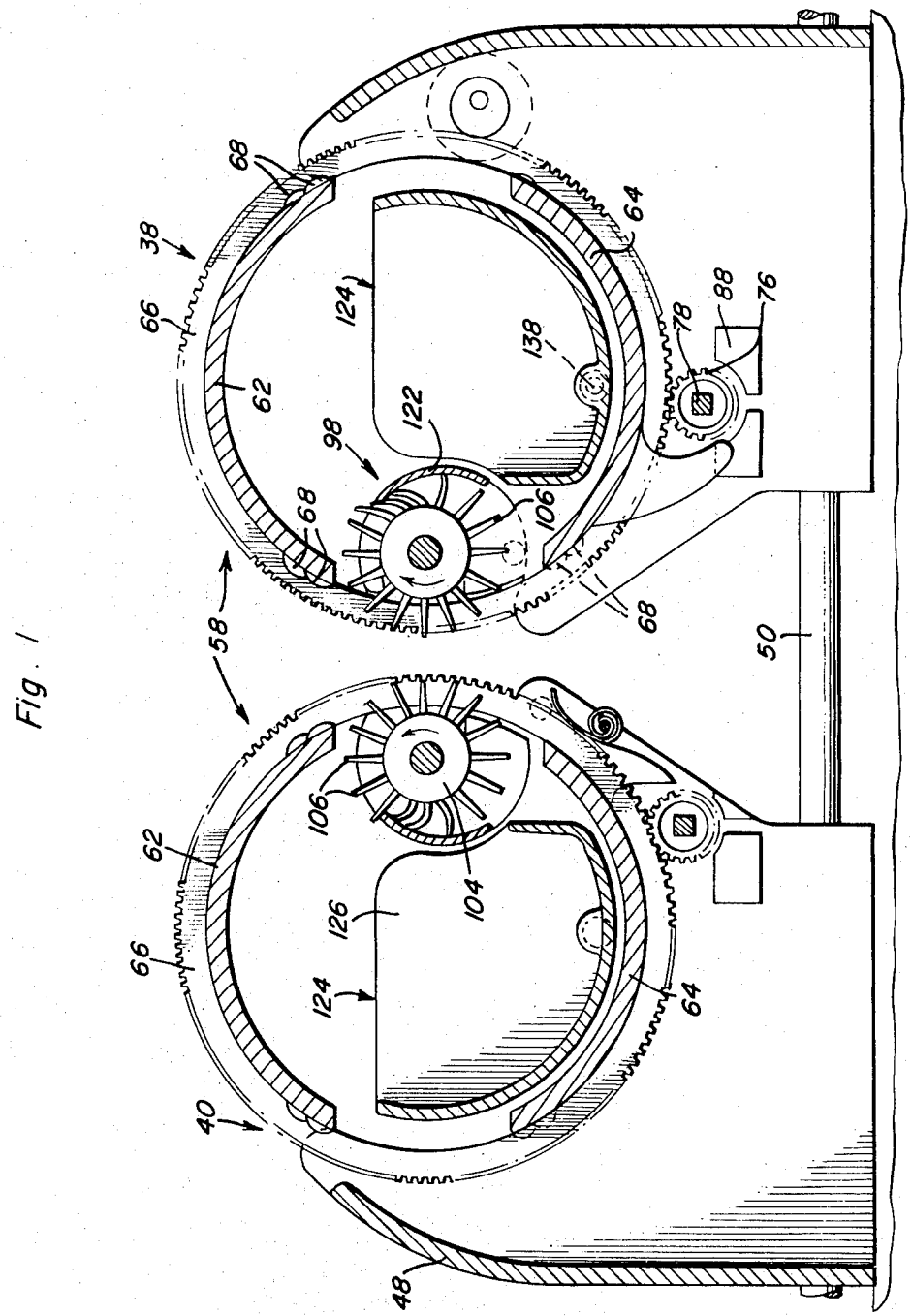
FIG. 1 is an enlarged cross-sectional view through the meat cleaning machine.

As with the machine in U.S. Pat. No. 3,606,628, the meat cleaning machine is formed at an inclination with similar lower and upper sections 38 and 40, both including a housing 42 which consists basically of opposed front and rear walls 44 and 46, and an elongated outer wall 48 extending therebetween. The upper section 40 is mounted for sliding movement toward and away from the lower section 38 by means of front and rear elongated rods 50 affixed to the front and rear housing walls 44 and 46 of the lower section 38 and projecting upwardly therefrom. The corresponding front and rear walls 44 and 46 of the upper section 40 are in turn provided with elongated sleeves 52 which are slidably received over the rods 50 to enable the aforementioned sliding movement of the upper section 40 along the rods 50 toward and away from the lower section 38. It will of course be appreciated that the sliding movement is to enable an automatic accommodation of cuts of meat of different thicknesses. The aforedescribed construction is similar to that set forth in U.S. Pat. No. 3,606,628, and as such, a further elaboration thereof is not considered necessary herein.

The actual gripping and movement of the meat through the cleaning machine 10 is effected by a pair of opposed wire-like cylinders or cylindrical rollers 58, one mounted within each of the sections 38 and 40. Each roller 58 includes a pair of rigid annular end rings 60 interconnected by elongated arcuate upper and lower positioning shields 62 and 64, the opposite ends of which are received within the opposed mounting rings 60 and affixed thereto by appropriate bolt means or the like. The positioning shields 62 and 64 mount a series of annular blades or gripping rings 66 at equally spaced points therealong between the two mounting rings 60. Each of the gripping rings 66 is provided with a uniformly serrated or toothed outer edge which functions to insure a proper, positive, yet non-compacting gripping of the meat. In addition, the toothed edges of the rings are utilized in the simultaneous driving of the rings of each roller 58.

In order properly to orient and slidably maintain each of the gripping rings 66 about the two positioning shields 62 and 64, the upper shield 62 is provided, along both longitudinal edges thereof, with a series of alternately offset spaced positioning lugs 68, the spacing between each pair of lugs being sufficient to maintain one of the rings 66 for sliding movement in response to a rotational driving thereof. The lower positioning shield 64 includes similar stabilizing lugs 68 along the rear edge thereof, that is the edge outward of the portion of the roller which is to combine with the second roller in defining the meat path through the cleaning machine 10. The inner longitudinal edge of the lower shield 64 is provided with a plurality of enlarged arcuate lugs 70 of a height so as to project substantially beyond the gripping rings 66.

Each of the end mounting rings 60 is provided with an integral radially outwardly projecting enlargement or ear 72 which rotatably mounts a laterally directed inwardly projecting bearing sleeve 74, the sleeves 74 of each pair of mounting rings 60 being aligned and mounting a tubular ribbed drive shaft 76. The ribs of the shaft 76 are so sized, and the shaft 76 so oriented, as to mesh with the teeth of the gripping rings 66 whereby a synchronized driving of the rings 66 of the roller 58 will be effected upon a rotational driving of the shaft 76.

The two bearing sleeves 74 which mount the shaft 76 have square internal passages therethrough for the reception of an elongated square drive pin 78. The pin 78, noting FIG. 2 in particular, is inserted through an enlarged opening in the front wall 44 and extends through the aligned bearing sleeves 74 and intermediate supported shaft 76 with the inserted end of the pin 78 engaging within an appropriate rear wall mounted drive unit 80 which is sprocket driven.

In order to facilitate the insertion of the drive pin 78, each of the bearing sleeves 74 will also both be provided with a tapered or conically formed mouth at the end thereof into which the pin is to be inserted, for example as indicated by reference numeral 86. In order properly to seat the roller or cylinder 58, the integral ears 72 of the mounting rings 60 are seated within inwardly directed seats 88 provided on the inner face of each of the walls 44 and 46.

With reference to FIG. 1, slight differences will be noted in the construction of the various equivalent components of the lower and upper sections 38 and 40. Such differences arise from the inclination of the cleaning machine.

The actual cleaning of the cut of meat as it is moved vertically downwardly between the sections 38 and 40 by the parallel gripping rollers 58 is effected by a pair of elongated brushes or brush units 98, one mounted to extend longitudinally through each cylinder 58 adjacent the inner periphery thereof to engage, through the moving and gripping rings 66, the downwardly moving cut of meat. The ring cylinders rotate inwardly and downwardly to grip and move a cut of meat downwardly at a predetermined rate. At the same time, the brushes rotate upwardly and outwardly to engage the opposed sides of the cut of meat and effect an upward brushing and scraping of the surface particles therefrom. Each brush 98 includes an elongated central shaft 100 which, along a major portion of the length thereof sufficient to correspond substantially to the length of the cylinder 58, mounts a series of brushing or scraping members 102, each of which includes a central hub 104 and a plurality of circumferentially spaced radiating generally flat flexible fins 106, each having a wide, generally continuous, flat scraping surface on the outer end thereof, as shown in FIG. 2. The brushing members 102 are frictionally retained on the shaft 100, each being slightly rotatably offset from the adjacent member 102 to define a spiraling pattern of fins or blades 106 along the length of the shaft 100. This spiraling arrangement will effect a progressive engagement with the meat and thereby provide for a balanced operation of the brush 98.

With reference to FIG. 4 in particular, it will be noted that each of the fins or brushing blades 106 has a cross section which tapers gradually outward from the central hub for approximately half its length and continues to the free end thereof with a narrow flat configuration. Formed in this manner, the flexible fins will effectively brush the meat, flexing as they do so, and, upon release of engagement from the meat, as well as an associated scraper to be described subsequently, straighten slowly, quietly and smoothly, avoiding an unnecessary and possibly detrimental flapping action. Incidentally, it will be noted that the hubs 104 are slightly thicker than the associated fins 106. In this manner, a slight spacing is provided between fins of adjacent members 102, these spacings being so oriented as to correspond to the gripping rings 66 to allow for a smooth movement of the rings and fins by and relative to each other as they move in opposite directions.

The shaft 100 also mounts a pair of spacers 108 provided thereon at the opposite ends of the brushing portion formed by the members 102. Each of the spacers 108 is rotatably mounted within a collar 110 through an interposed bearing 109. The collar 110 is provided with an outwardly projecting positioning pin 112 paralleling the central shaft 100 in outwardly spaced relation thereto. With reference to FIG. 2, it will be noted that the rear wall includes an aperture 114 formed therein which receives the positioning pin 112 on the rearmost bearing mounted collar 110, thus retaining the associated bearing 109 and allowing a rotation of the brush shaft and bristles or fins therewith.

The rear end of the shaft 100 interlocks with a drive shaft 111 beyond the bearing 109. The drive shaft 111 projects forwardly from a drive unit 116, into engagement with the brush shaft 100 and rearwardly for stabilized rotational reception within an inwardly projecting retaining socket 118 on an appropriate drive train cover 120 mounted exteriorly over the rear wall 46. The brush or brush unit 98 is thus cantilevered through the corresponding cylinder or roller 58 from the driven rear thereof.

In order to maintain the fins 106 in a continuous clean condition, an elongated, relatively narrow, arcuate scraper plate 122 is provided along the brush unit 98 immediately to the rear of the rotating fins 106 and positioned to engage and cause a flexing of the fins and a corresponding scraping of the food particles therefrom. This scraper 122 has the opposite ends thereof bolted or otherwise suitably affixed to the two end collars 110 on the brush shaft 100. FIG. 1 is of interest in illustrating the manner in which the brush fins 106 engage the scraper 122 and flex inwardly thereof while the scraps thereon will fall therefrom over the outer surface of the scraper 122. The spiral arrangement of the fins 106 allows for a smooth sequential flexing of the fins along the length of the brush so as not to interfere with the rotational driving of the brush. In addition, the particular cross section of the fins, as illustrated in FIG. 4, insures a smooth flexing and return of the fins to their outwardly extended operational position.

An elongated scrap tray 124 is positioned longitudinally within each cylinder or cylindrical roller 58 slightly to the rear and below the associated brush unit 98. Each scrap tray 124 has a generally arcuate body extending between a rear wall 126, including a relieved portion 128 to accommodate the brush unit, and an enlarged flat front wall 130 which engages against and encloses the enlarged access recess provided in the front wall 44 of the corresponding housing 42. The arcuate body 124 includes a relatively low inside wall 132 and a relatively high outside wall 134.

The tray 124, when positioned, noting FIG. 1 in particular, is so oriented whereby the scraps scraped by the corresponding brush unit 98 will, particularly upon engagement of the fins 106 with the scraper 122, be discharged into the scrap tray 124 over the low inside wall 132 thereof, the high outside wall 134 being in the nature of a catcher or backstop for the scraps. The removal and emptying of the scrap tray 124 is simplified by the provision of an enlarged handle 136 on the front wall 130 thereof. Further, proper orientation of the scrap tray is insured through the use of one or more locating pins 138 thereon, note FIG. 2 in particular. In addition, the front wall 130 of the scrap tray 124 is appropriately apertured to receive both the front end of the brush shaft 100 and the front locating pin 112 on the front brush shaft collar 110.

The components of each of the sections 38 and 40 are driven through individual drive or power transmitting lines, each of which engages an appropriate gear box 142 which drives an endless chain engaged about sprocket gears 148 and 150 on the cylinder and brush driving drive units 80 and 116. As previously indicated, the driving of the components in this manner will result in an inward and downward rotation of the two gripping and moving cylinders in conjunction with an upward and outward rotation of the two brush units.

The introduction of the meat into the meat cleaning machine is to be effected over the inwardly and downwardly rotating cylinder 58 of the lower section 38, the meat being placed on the upper surface thereof and carried therearound for engagement by the second cylinder.

From the foregoing, it will be appreciated that the system of the instant invention, unique in its overall concept, incorporates an improved and highly practical meat cleaning machine in which the meat is received and vertically guided by a pair of oppositely rotating cylinders formed, in each instance, of a series of independent gripping rings with toothed exteriors. The fins of an internal revolving brush selectively project through the spaced rings for cleaning engagement with the cut of meat. The rings travel over upper and lower shields which guide and retain the rings, the shields being so spaced as to allow for a proper orientation of the brush and an operative engagement of the brush with the moving meat. It will also of course be appreciated that the materials used throughout the machine, whether of plastic or metal, are appropriate for use in food handling equipment, enabling the provision of sterile food engaging components, easily cleaned and maintained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In a meat cleaning machine, a meat cleaning brush comprising at least one brushing unit, said unit including a central hub and a plurality of flexible scraping members supported at one end by said hub and extending outwardly therefrom, each member having a wide, generally continuous, flat scraping surface on the other end thereof, and including a scraper plate located lengthwise along said brush and having a leading edge located within the circle defined by the outer edges of the flexible scraping members and a trailing edge located outside the circle defined by the outer edges of the flexible scraping members and a body portion joining said leading and trailing edges to unflex said scraping members slowly and smoothly during release of engagement between said scraping members and said scraper plate, avoiding possibly detrimental flapping action.

2. The device of claim 1 wherein each member is an integral fin having a generally tapered cross section outward from said hub, said fin being thicker at said one end and thinner at its outer end.

3. The device of claim 1 further comprising a series of adjacent said brushing units.

4. The device of claim 3 wherein each brushing unit is rotationally offset from the adjacent brushing unit so as to define a spiraling pattern of scraping members along the length thereof.

5. In a meat cleaning machine, a meat cleaning brush comprising at least one brushing unit, said unit including a central hub and a plurality of flexible scraping fins supported at one end by said hub and extending outwardly therefrom, each fin having a wide, generally continuous, flat scraping surface on the other end thereof, and including a scraper plate extending lengthwise along said brush and including an edge space inwardly of the outer edges of the flexible scraping fins for engagement, flexing, and scraped cleaning of said fins, said scraper plate including means for cooperating with said fins upon and during release of engagement between said fins and said plate to unflex said fins slowly and smoothly, avoiding possibly detrimental flapping action.

6. In a meat cleaning machine, a meat cleaning brush comprising a series of interconnected brushing units, each unit including a central hub and a plurality of flexible scraping members supported by and extending outwardly therefrom, each member having a scraping surface thereon opposite said hub, and a scraper plate extending along said brush and including an edge inwardly spaced relative to the outer edges of the flexible scraping members for engagement, flexing, and scraped cleaning of said members, said scraper plate including means for cooperating with said members upon and during release of engagement between said members and said plate to unflex said members slowly and smoothly, avoiding possibly detrimental flapping action.

7. The device of claim 6 wherein said members define a generally spiral arrangement for a smooth sequential flexing thereof along the length of said brush to minimize fluctuations of brush rotating torque.

8. The device of claim 6 further comprising an elongated scrap receiving tray mounted adjacent said scraper plate for a reception therefrom of the scraps cleaned from said members.

9. In a meat cleaning machine, a flexible scraper blade mounted for movement along a predetermined path for engaging and scraping to cut surface of a piece of meat to remove accumulated residues therefrom, comprising:

a. a base mounting said scraper blade, b. an elongated scraper blade body portion extending from said base, c. a flat, blade-like scraping surface for engaging, scraping, and cleaning the cut meat surface, said scraping surface being located on the end of said body portion opposite said base, and d. a scraper plate located along said path to engage said blade body portion following scraping of the cut meat surface, said scraper plate having a leading edge located to engage the blade body portion below said scraping surface and a trailing edge located outside the path of said scraping surface and a scraper plate body portion joining said leading and trailing edges to unflex said scraper blade slowly and smoothly during release of engagement between said scraper blade and said scraper plate, avoiding possibly detrimental flapping action.

10. The blade structure of claim 9 further comprising a plurality of said blades extending serially from said base for sequential engagement with the meat.

11. The blade structure of claim 10 wherein said base defines a circular hub with said blades extending outwardly from the circumference thereof.

12. The blade structure of claim 11 further comprising a series of said hubs connected axially together.

13. The blade structure of claim 12 wherein each said hub is slightly rotated about the common axis of said series of hubs to define a spiralling series of said scraper blades therealong.

* * * * *